(12) United States Patent
Shiroor et al.

(10) Patent No.: US 9,069,454 B2
(45) Date of Patent: Jun. 30, 2015

(54) MULTI-SELECT TOOLS

(75) Inventors: Kedar Shiroor, Mountain View, CA (US); Bernd Christian Scheirmann, Mountain View, CA (US)

(73) Assignee: SAP SE, Walldorf (DE)

( * ) Notice: Subject to any disclaimer, the term of this patent is extended or adjusted under 35 U.S.C. 154(b) by 52 days.

(21) Appl. No.: 13/222,988

(22) Filed: Aug. 31, 2011

(65) Prior Publication Data
US 2013/0055168 A1 Feb. 28, 2013

(51) Int. Cl.
*G06F 3/033* (2013.01)
*G06F 3/0488* (2013.01)

(52) U.S. Cl.
CPC ..................................... *G06F 3/0488* (2013.01)

(58) Field of Classification Search
None
See application file for complete search history.

(56) References Cited

U.S. PATENT DOCUMENTS

| | | | | |
|---|---|---|---|---|
| 2004/0049729 | A1* | 3/2004 | Penfield | 715/503 |
| 2006/0293763 | A1* | 12/2006 | Rivard | 700/2 |
| 2009/0138830 | A1* | 5/2009 | Borgaonkar et al. | 715/863 |
| 2009/0174680 | A1* | 7/2009 | Anzures et al. | 345/173 |
| 2009/0300554 | A1* | 12/2009 | Kallinen | 715/863 |
| 2010/0257094 | A1* | 10/2010 | Kumar et al. | 705/40 |
| 2011/0163968 | A1* | 7/2011 | Hogan | 345/173 |
| 2011/0193795 | A1* | 8/2011 | Seidman et al. | 345/173 |
| 2012/0005045 | A1* | 1/2012 | Baker | 705/27.2 |
| 2012/0102074 | A1* | 4/2012 | Mital et al. | 707/805 |
| 2012/0180002 | A1* | 7/2012 | Campbell et al. | 715/863 |

OTHER PUBLICATIONS realtor.com iphone application, pulled from Internet Aug. 23, 2011: http://www.realtor.com/mobile/iphone.
realtor.com android application, pulled from Internet Aug. 23, 2011: http://www.realtor.com/mobile/android.
realtor.com ipad application, pulled from Internet Aug. 23, 2011: http://www.realtor.com/mobile/ipad.
realtor.com windows phone7 application, pulled from Internet Aug. 23, 2011: http://www.realtor.com/mobile/windowsphone7.

* cited by examiner

*Primary Examiner* — William Bashore
*Assistant Examiner* — Hien Duong
(74) *Attorney, Agent, or Firm* — Kenyon & Kenyon LLP

(57) ABSTRACT

Touch-sensitive features of devices may be used to demarcate a displayed area on the device to identify a set of data points contained in the demarcated area. After identifying the data points in the demarcated area, the user may be presented with an interface on the display listing different actions that may be performed on at least one of the identified data points. After the user selects the actions to be performed, the computing device may perform the selected actions on one or more of the identified data points in demarcated area.

14 Claims, 7 Drawing Sheets

FIG. 3
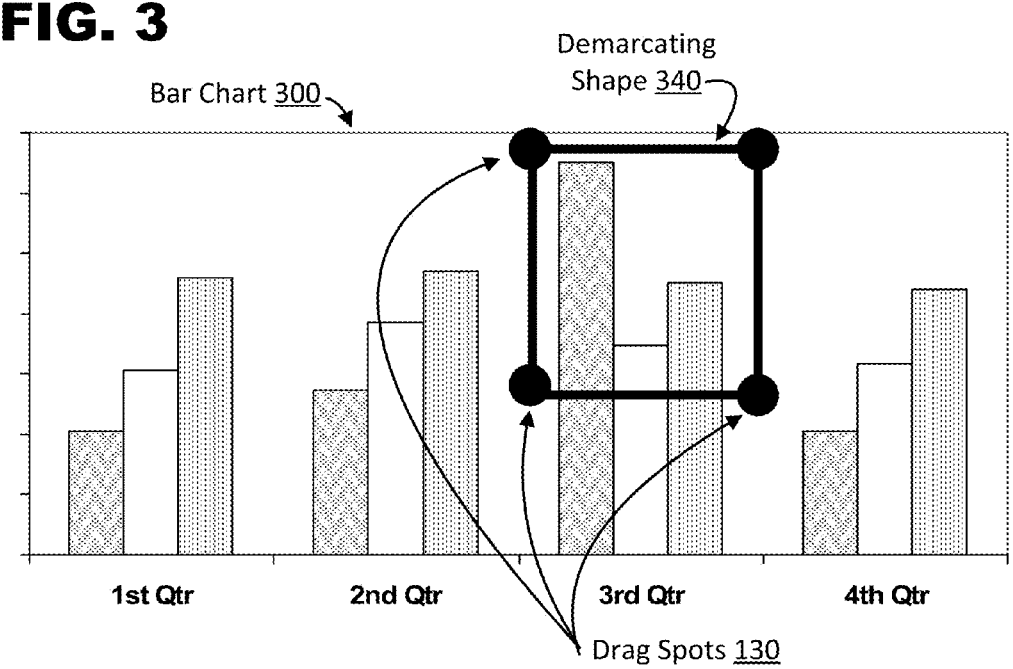
Data Point Analysis 360
| | |
|---|---|
| Total 3Q Value: | 8,113,123.00 |
| Total 3Q Gain: | 4,244,241.00 |
Estimate 1:
Parameter 2:
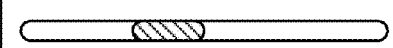
Influencer 1 & 2:

MULTI-SELECT TOOLS

BACKGROUND

Computing devices with touch sensitive surfaces enable users to use a finger or other object to perform various functions and operations. For example, users may be able to press buttons, slide scrollbars, navigate though documents, and draw objects using the touch sensitive surfaces. In smaller computing devices, such as smart phones and tablets, a display surface of the device is often designed to be touch-sensitive.

While these touch-sensitive surfaces enable users to interact with the computing device, they may make it cumbersome for users to quickly perform certain actions on a set of data points included within a dataset. This is because users may have to individually select each of the data points in the dataset and then independently select the particular action they want to perform on the selected data points, or vice versa. Such a process is time consuming and makes it relatively difficult for these users to quickly manipulate multiple data points in larger datasets.

In some instances, developers have provided area highlighting tools that, for example, allow users to draw, using the touch-sensitive surface, an area on a map to focus the results of a search to places within the drawn area on a map. However, these tools are provided to focus searches on particular geographic areas drawn on the map. They are not used, for example, to identify actions associated with data points in the drawn area, present the user with an interface to select an identified action, and perform the selected action on one or data points in the demarcated area.

There is a need for users of computing devices with touch sensitive surfaces to be able to quickly manipulate and/or perform actions on particular data points in larger data sets.

BRIEF DESCRIPTION OF THE DRAWINGS

FIG. 3 shows an exemplary embodiment of the invention in which the dataset is a bar chart

DETAILED DESCRIPTION

Figure 1:
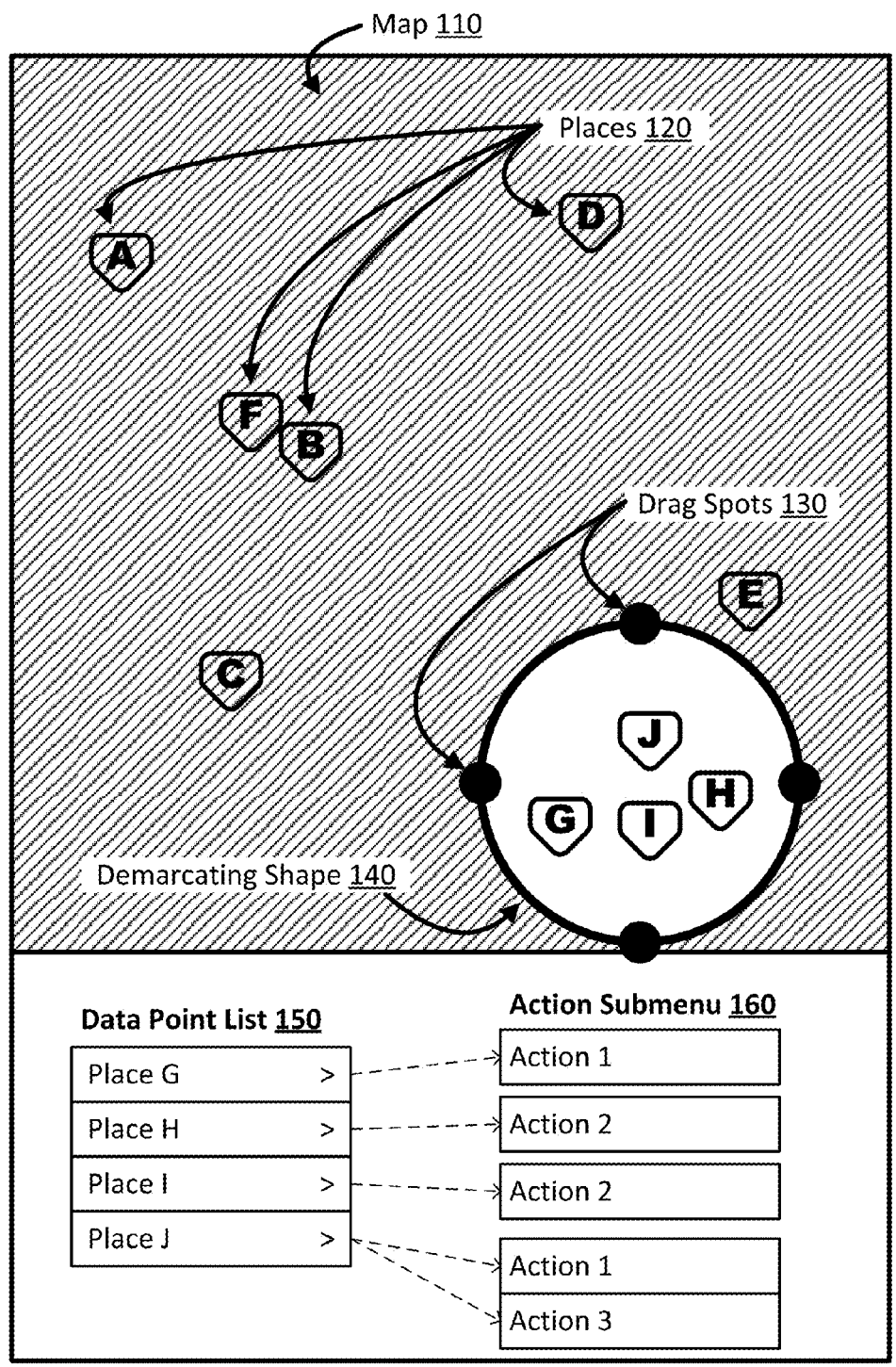
FIG. 1 shows a first exemplary embodiment of the invention in which the dataset is a map.

In an embodiment of the invention, a user of a touch-sensitive computing device may use the touch-sensitive feature of the device to demarcate an area on a display of the device to identify a set of data points contained in the demarcated area. After identifying the data points in the demarcated area, the user may be presented with an interface on the display listing different actions that may be performed on at least one of the identified data points. After the user selects the actions to be performed, the computing device may perform the selected actions on the corresponding identified data points in demarcated area.

To initially demarcate an area on the display, a user may drag a finger or other object across a section of a touch-sensitive display that the user wants to demarcate. In response, the computing device may demarcate an area on a display of the touch-sensitive device in proportion to a detected touch-initiated dragging by a user on the touch-sensitive device. In some instances, demarcation shapes, such as a rectangle, circle, or freeform tool enabling the user to custom select an asymmetrical demarcation area on the display may be used.

The rectangle and circle shapes may be used, for example, by having the user's first touch initially position a section of the shape, and then having the user's subsequent movements in different directions expand and/or contract the shape in proportion to a dragging by the user. Other shapes, such as octagons, trapezoids, and so on may also be provided in different embodiments. The freeform tools may be used, for example, by having the user's first touch form a start point of a path and subsequent dragging movements form a path creating a demarcated area on the display.

In some instances, the user may be able to select and/or change the shape the user wants to use to create the demarcated area by pressing and holding a designated area of the touch-sensitive device to invoke a shape selecting menu from which the user may select a desired area demarcating shape. The designated area of the display to be pressed and held may include a region containing the dataset from which the data points may be selected. In other words, the computing device may, responsive to a stationary contact for a predetermined period with an area of the touch-sensitive device corresponding to the dataset, invoke a menu presenting a plurality of area demarcating shapes. When the user selects at least one of the area demarcating shapes, the computing device may demarcate the area on the display using a geometry of the selected shape proportional to the subsequent detected touch-initiated dragging by the user.

In some instances, one or more drag points may be displayed on the display of the touch-sensitive device after initially demarcating an area on the display. The drag points may be dragged by the user to expand, contract, adjust, or otherwise change the demarcated area. For example, a drag point may be dragged away from a demarcated area to expand the demarcated area, or dragged towards the demarcated area to contract it. In some instances, drag points may be located on a border of the demarcated area. Drag points may also be positioned on one or more vertices, segments, or sections of the demarcated area.

After an area on the display has been demarcated, actions associated with data points included in the demarcated area may be identified and then presented to a user through an interface on the display. The user may use the interface to select one or more actions to be performed. Once the user selects one or actions to be performed, the selected actions may be perform on at least one data point in the demarcated area associated with the selected action.

Different actions may be identified in different embodiments depending on the context and/or an intended use of the interface. For example, if the interface is provided to enable a quick reassignment or rescheduling of multiple tasks, the actions presented may relate to reassigning or reschedule various tasks. On the other hand, if the interface is provided to check on the progress or status of different tasks, the actions presented may relate to different type of task inquiries.

Additionally, the actions associated with different data points may vary depending on the type of data point. For example, if the data point in a calendar is a meeting, the actions may include rescheduling the meeting, sending a meeting reminder, or other meeting related actions. However, if the data point is a task, the actions may include updating a task progress, checking a task status, reassigning the task, and so on. Thus, different types of data points may be associated with different actions and the identified actions may vary depending on the data points included in the demarcated area.

Figure 2:
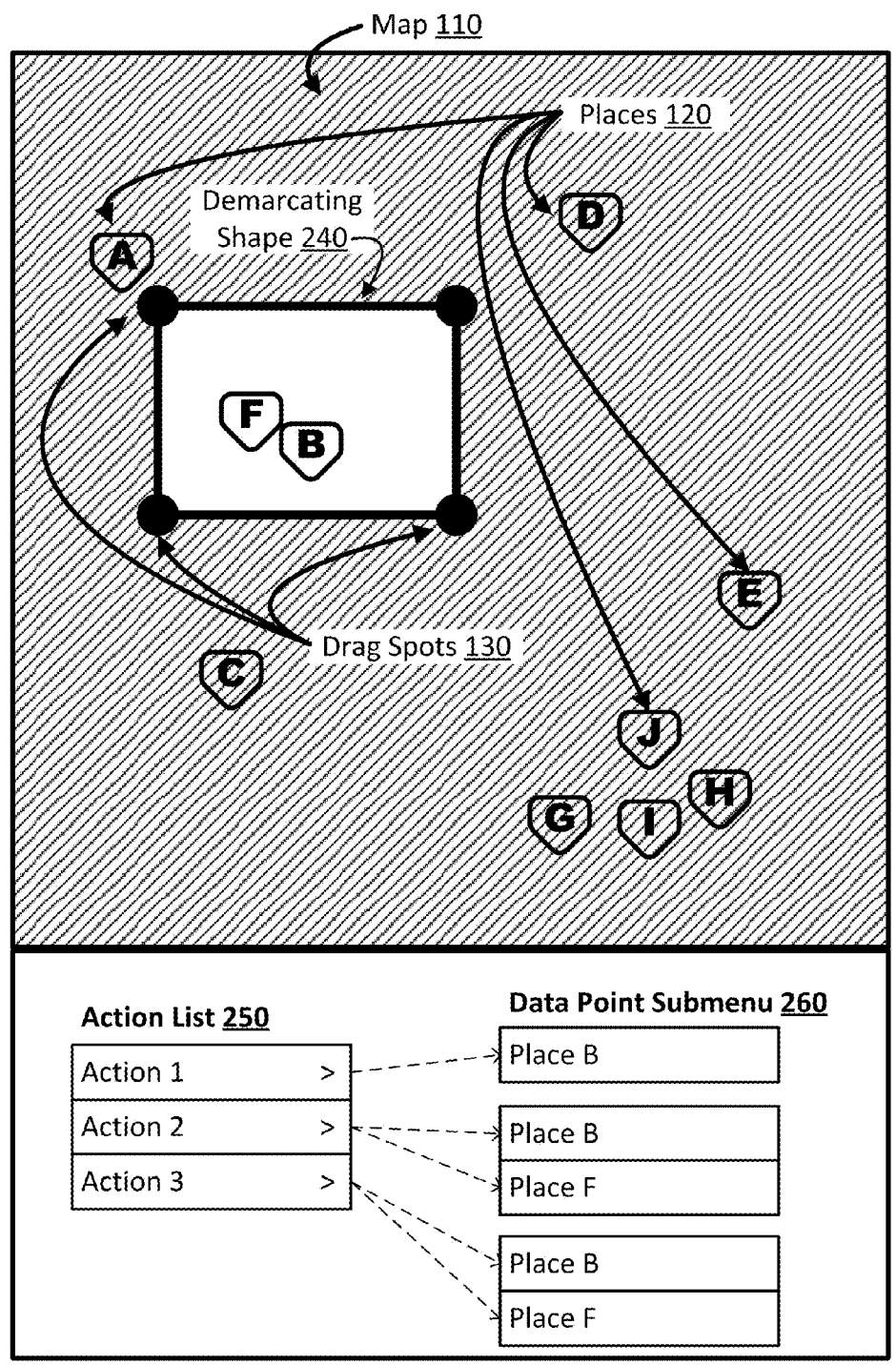
FIG. 2 shows a second exemplary embodiment of the invention in which the dataset is a map.

FIGS. 1 and 2 show exemplary embodiments in which the dataset is a map 110, the data points are places 120, and a user selected action is executed on at least one place within a demarcated region 140 and 240 of the map 110. In FIG. 1, the demarcating region shape 140 is a circle, whereas in FIG. 2, the shape 240 is a rectangle. Other shapes may be used in other embodiments. A border of the demarcated region shape 140 and 240 may include one or more drag spots 130, which may be dragged by the user to expand, contract, or otherwise alter the demarcated region.

In FIGS. 1 and 2, the hatched area of the map 110 may identify the non-demarcated area while the non-hatched area within the demarcating shapes 140 and 240 respectively, may identify the demarcated area. In FIG. 1, places G to J may be identified as being included in the demarcated area. The identified data point places G to J may be presented in a data point list 150 in the interface. Once the user selects a data point in the list 150, an action submenu 160 may display at least one action associated with the selected data point for further selection by the user to perform the action.

In FIG. 2, places B and F may be identified as being included in the rectangular demarcated area 240. In this embodiment, an action list 250 of possible actions associated with places B and F may displayed in the interface. Once the user selects an action in the list 250, a data point submenu 260 may display the data points in the demarcated area associated with the selected action for further selection by the user to perform the selected action(s) on the selected data point(s).

Figure 4:
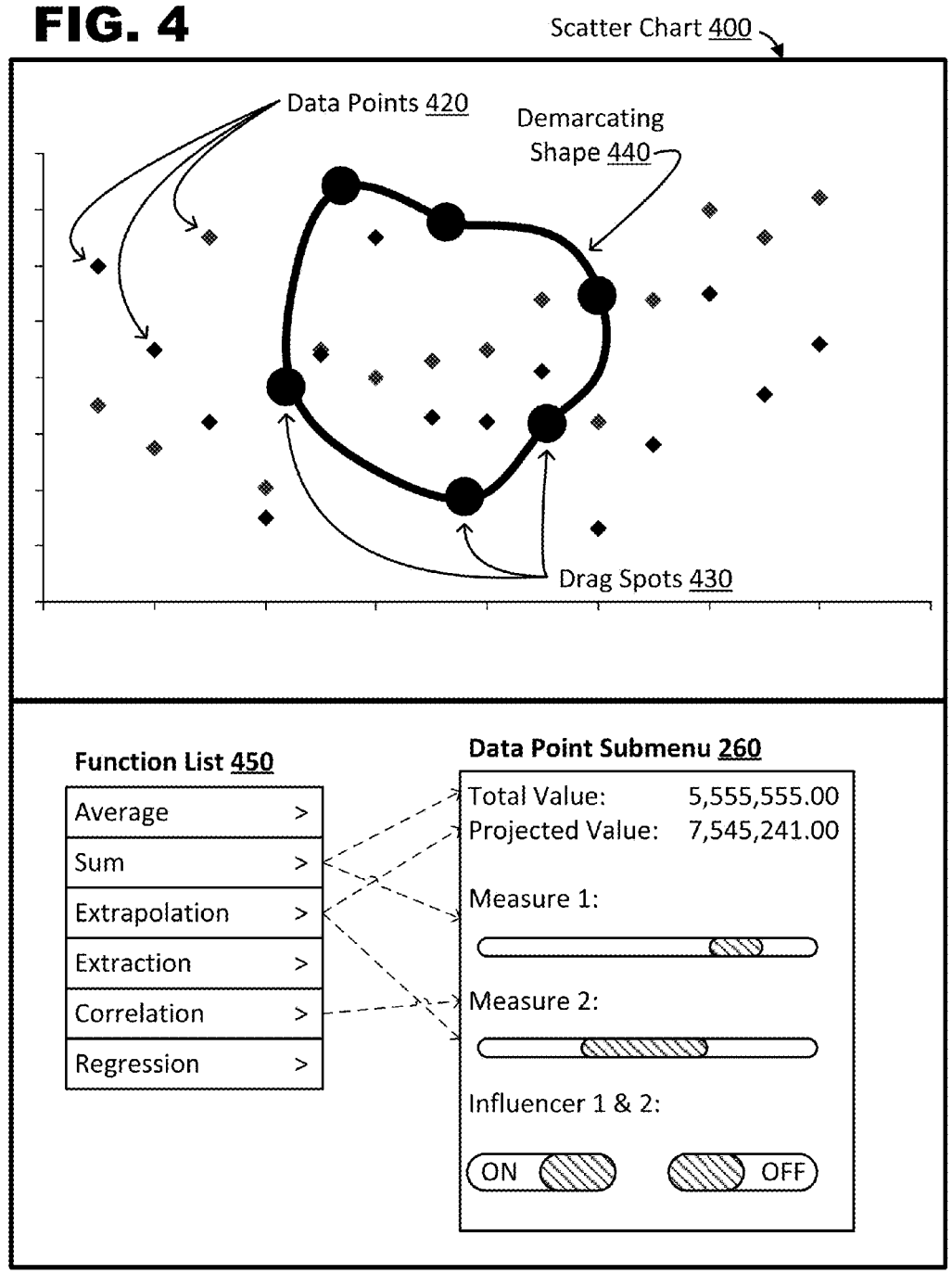
FIG. 4 shows an exemplary embodiment of the invention in which the dataset is a scatter chart.

FIGS. 3 and 4 show exemplary embodiments in which the dataset is a bar chart 300 and scatter chart 400, respectively, and the actions associated with data points in the charts 300 and 400 involve at least one statistical function to be applied to the data points in the demarcated area. In FIG. 3 the demarcating shape 340 is a square, while in FIG. 4 the demarcating shape is a freeform shape 440.

FIG. 3 also includes an exemplary data point analysis 360 resulting from applying one or more statistical functions to the data points in the demarcating square shape 340. The analysis 360 may report a total estimated or actual results, and may include adjustable parameters, such as parameter 2 and influencer 1 & 2, so the user can quickly visualize effects of modifications or changes to the analysis.

FIG. 4 also includes a list of statistical functions 450 that may be applied to the data points 420 in the freeform demarcated area 440. The functions may include one or more average, sum, extrapolation, extraction, correlation, standard deviation, and/or regression functions. A data point submenu may provide additional customizations or modifications to the formulas, including one or more adjustable parameters, measurements, variables, or other influences on the calculated results.

Figure 5:
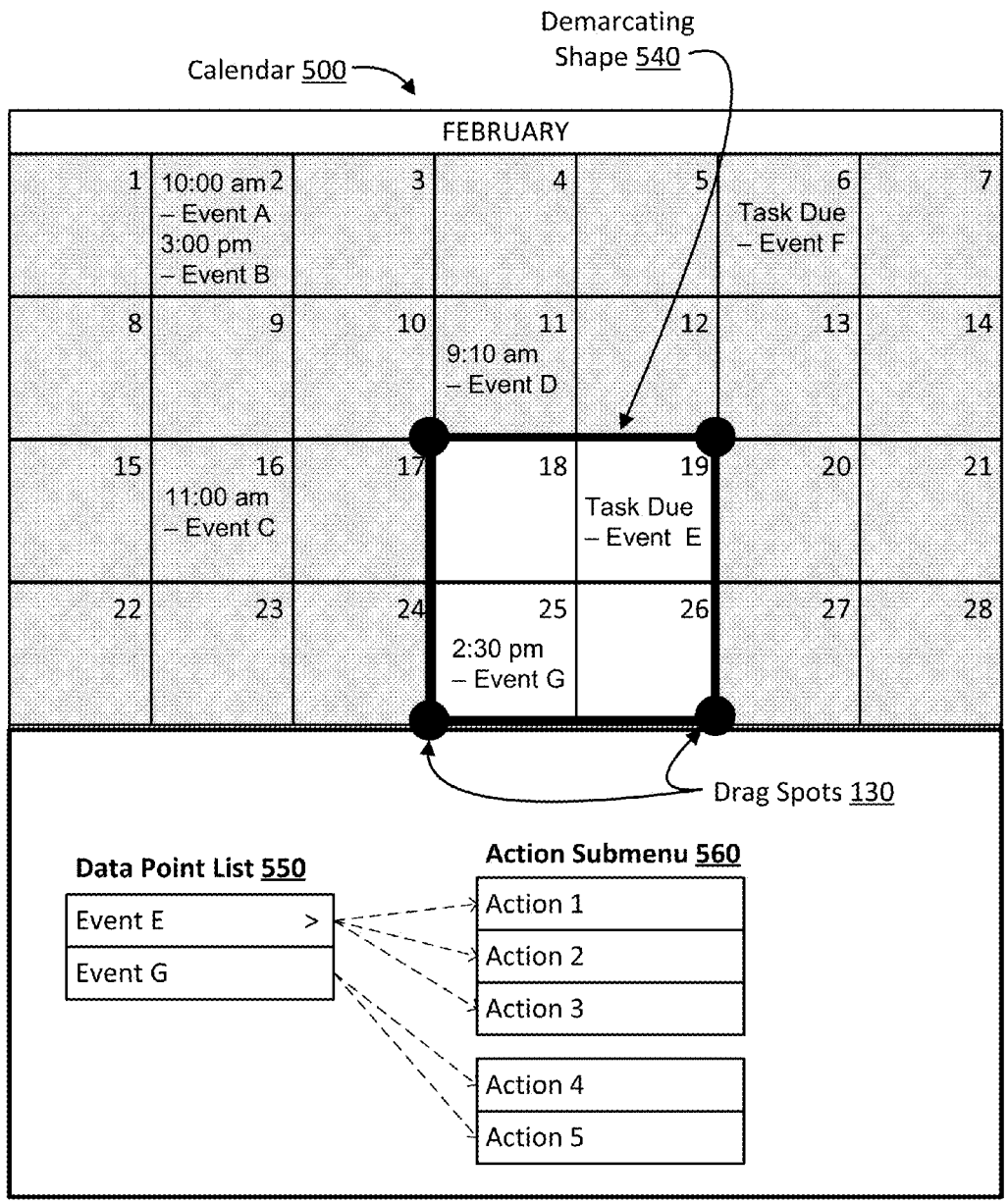
FIG. 5 shows an exemplary embodiment of the invention in which the dataset is a calendar.

FIG. 5 shows an exemplary embodiment in which the dataset is a calendar 500, the data points are dates and/or events, and a user selected action is performed on at least one event occurring on at least one date in the rectangular demarcated shape 540. A data point list of events 550 occurring on the demarcated dates may be presented in the interface to the user for further selection. In this example, Events E and G are scheduled to occur within the rectangular demarcating shape 540 and so these two events may be included in the data point list 550. Once the user selects at least one data point in the list 550, an activatable submenu of actions 560 associated with the selected data point(s) may be presented in the interface, in which at least one action to be perform may be selected by the user.

In some embodiments, in addition to, or in some instances instead of, demarcating dates, a user may be able to demarcate a specific time range on at least one date. Any selected actions to be performed may be then be limited to those events occurring in the demarcated time range.

Figure 6:
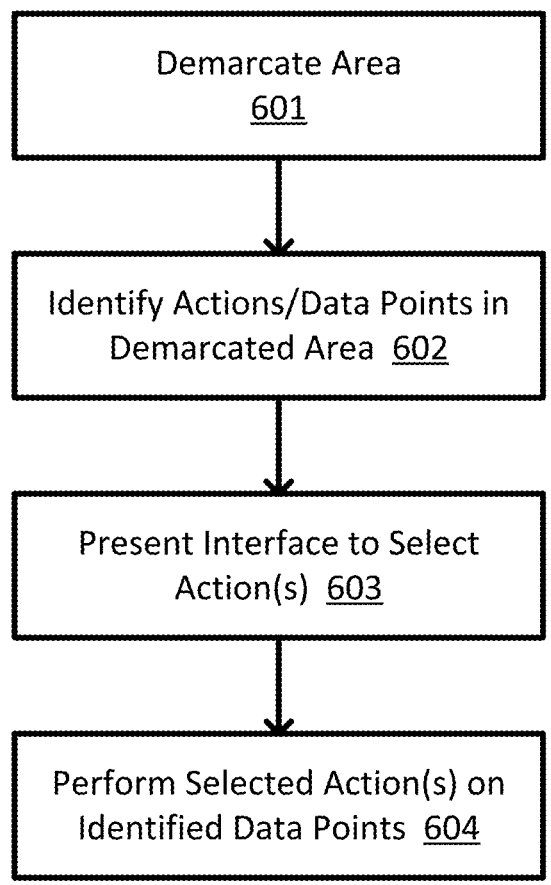
FIG. 6 shows an exemplary process in an embodiment of the invention.

FIG. 6 shows an exemplary process in an embodiment of the invention. In box 601, an area on a display of the touch-sensitive device may be demarcated in proportion to a detected touch-initiated dragging by a user on the touch-sensitive device.

In box 602, a plurality of actions associated with a plurality of data points included in the demarcated area may be identified.

In box 603, the user may be presented with an interface on the display to select from the plurality of identified actions.

Finally, in box 604, at least one action selected by the user may be performed on at least one data point in the demarcated area.

Figure 7:
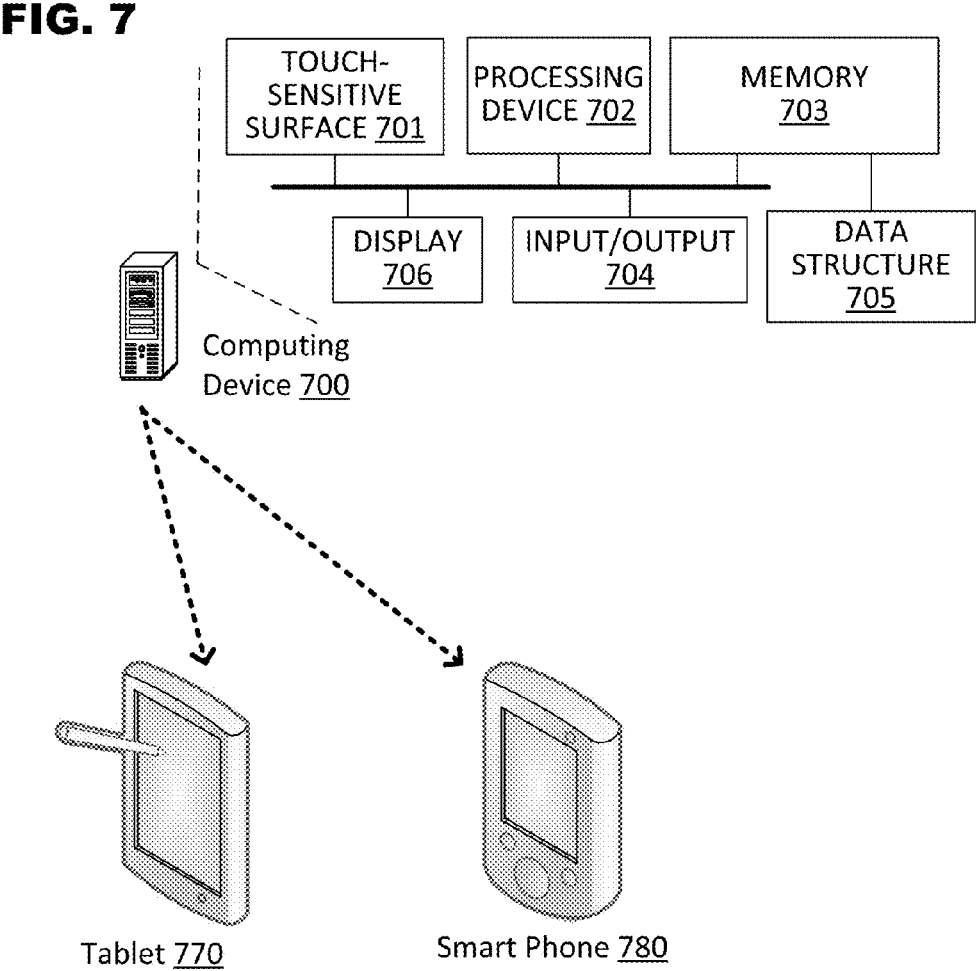
FIG. 7 shows an exemplary architecture of a computing device in an embodiment of the invention.

FIG. 7 shows an exemplary architecture of a computing device 510 in an embodiment of the invention. A computing device 700 may include a touch-sensitive surface 701, a processing device 702, a memory 703 storing structured data 705, an input/output device 704, and a display 706. Each of these components 701 to 706 may be interconnected via a system bus.

In some instances, a surface of the display 706 may be the touch-sensitive surface 701, though in other instances the two may be separate. Additionally, in some instances the computing device 700 may be a tablet 770, smart phone 780, or other type of portable computing device, though the computing device 700 need not be portable.

Communications input/output device 704 may enable connectivity between the computing device 700 and other computing systems, peripherals, and devices by encoding and/or transmitting data to be sent to the external devices and receiving and/or decoding data received from the external devices.

In an embodiment, memory 703 may contain different components for retrieving, presenting, changing, and saving data. Memory 703 may include a variety of memory devices, for example, Dynamic Random Access Memory (DRAM), Static RAM (SRAM), flash memory, cache memory, and other memory devices.

Processing device 702 may perform computation and control functions of a system and comprises a suitable central processing unit (CPU). Processing device 702 may include a single integrated circuit, such as a microprocessing device, or may include any suitable number of integrated circuit devices and/or circuit boards working in cooperation to accomplish the functions of a processing device. Processing device 702 may execute computer programs, such as object-oriented computer programs, within memory 703.

The foregoing description has been presented for purposes of illustration and description. It is not exhaustive and does not limit embodiments of the invention to the precise forms disclosed. Modifications and variations are possible in light of the above teachings or may be acquired from the practicing embodiments consistent with the invention. For example, some of the described embodiments may include software or hardware, but some systems and methods consistent with the present invention may be implemented in both software and hardware.

We claim:

1. A method of using a touch-sensitive computing device to apply at least one statistical function on at least one data point in a chart comprising:
   demarcating an area of the chart on a display of the touch-sensitive device in proportion to a detected touch-initiated dragging by a user on a touch-sensitive surface of the touch-sensitive device, wherein the demarcated area is of a shape and size which is a function of the touch-initiated dragging by the user;
   changing the demarcated area according to a detected touch-initiated dragging of at least one drag point, wherein a border surrounding the demarcated area includes the at least one drag point;
   identifying a plurality of statistical functions associated with a plurality of data points included in the demarcated area;
   identifying an adjustable parameter for each statistical function based on the function and the data points included in the demarcated area;
   presenting the user with an interface on the display including a menu to select from the plurality of identified statistical functions and a submenu to select from identified adjustable parameters;
   performing a user selected parameter adjustment of the user selected statistical function on the data points included in the demarcated area of the chart, wherein the performing of the parameter adjustment acts on at least one of the plurality of data points; and
   displaying a result of the performing on the interface on the display, wherein the interface is distinct from the chart including the demarcated area.

2. The method of claim 1, further comprising:
   responsive to a stationary contact for a predetermined period with an area of the touch-sensitive device corresponding to the chart, invoking a menu presenting a plurality of area demarcating shapes; and
   responsive to the user selecting at least one of the area demarcating shapes, demarcating the area on the display using a geometry of the selected shape proportional to the detected touch-initiated dragging by the user.

3. The method of claim 2, wherein the area demarcating shapes include a circle, a rectangle, and a freeform tool enabling the user to custom select an asymmetrical demarcated area.

4. The method of claim 1, further comprising:
   presenting a list of the identified statistical function in the interface; and
   responsive to the user selecting at least one of the identified statistical functions in the list, presenting a submenu including a plurality of the data points associated with the selected statistical function for further user selection.

5. The method of claim 1, further comprising:
   presenting a list of identified data points in the interface; and
   responsive to the user selecting at least one of the identified data points in the list, presenting a submenu including at least one of the identified statistical functions associated with the selected data points for further user selection.

6. The method of claim 1, wherein different data points are associated with different statistical functions and the identified plurality of statistical functions varies depending on the data points included in the demarcated area.

7. The method of claim 1, further comprising:
   displaying at least one drag point on the display of the touch-sensitive device after initially demarcating the area.

8. The method of claim 1, wherein the identified plurality of statistical functions presented in the interface are contextual and vary depending on an intended use.

9. The method of claim 1, wherein the identified statistical functions presented in the interface for user selection include applying at least one of the following functions to the data points in the demarcated area: an average function, a sum function, an extrapolation function, an extraction function, a correlation function, a regression function, and a standard deviation function.

10. A computing device comprising:
    a touch-sensitive surface;
    a display;
    and a processing device; wherein the processing device:
    demarcates an area of a chart on the display in proportion to a detected touch-initiated dragging by a user on the touch-sensitive surface, wherein the demarcated area is of a shape and size which is a function of the touch-initiated dragging by the user;
    changes the demarcated area according to a detected touch-initiated dragging of at least one drag point, wherein a border surrounding the demarcated area includes the at least one drag point;
    identifies a plurality of statistical functions associated with a plurality of data points included in the demarcated area;
    identifies an adjustable parameter for each statistical function based on the function and the data points included in the demarcated area;
    presents the user with an interface on the display including a menu to select from the plurality of identified statistical functions and a submenu to select from identified adjustable parameters; and
    performs a user selected parameter adjustment of the user selected statistical function on the data points included in the demarcated area of the chart, wherein the performing of the parameter adjustment acts on at least one of the plurality of data points; and
    displays a result of the performing on the interface on the display, wherein the interface is distinct from the chart including the demarcated area.

11. The computing device of claim 10, wherein a surface of the display is the touch-sensitive surface.

12. The computing device of claim 11, wherein the device is a tablet.

13. The computing device of claim 11, wherein the device is a smart phone.

14. A device comprising a non-transitory computer readable medium storing instructions that, when executed by a processing device, cause a touch-sensitive computing device to:
    demarcate an area of a chart on a display of the touch-sensitive device in proportion to a detected touch-initiated dragging by a user on a touch-sensitive surface of the touch-sensitive computing device, wherein the demarcated area is of a shape and size which is a function of the touch-initiated dragging by the user;
    change the demarcated area according to a detected touch-initiated dragging of at least one drag point, wherein a border surrounding the demarcated area includes the at least one drag point;
    identify a plurality of statistical functions associated with a plurality of data points included in the demarcated area;
    identify an adjustable parameter for each statistical function based on the function and the data points included in the demarcated area;

present the user with an interface on the display including a menu to select from the plurality of identified statistical functions and a submenu to select from identified adjustable parameters; and perform a user selected parameter adjustment of the user selected statistical function on the data points included in the demarcated area of the chart, wherein the performing of the parameter adjustment acts on at least one of the plurality of data points; and display a result of the performing on the interface on the display, wherein the interface is distinct from the chart including the demarcated area.

* * * * *